United States Patent
Cheng et al.

(10) Patent No.: US 9,917,789 B2
(45) Date of Patent: Mar. 13, 2018

(54) COMPUTING ELEMENT ALLOCATION IN DATA RECEIVING LINK

(71) Applicant: INTERNATIONAL BUSINESS MACHINES CORPORATION, Armonk, NY (US)

(72) Inventors: Xinhao Cheng, Shanghai (CN); Yonghua Lin, Beijing (CN); Chao Xue, Beijing (CN); Rong Yan, Beijing (CN); Chao Zhu, Beijing (CN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 101 days.

(21) Appl. No.: 14/907,898

(22) PCT Filed: Jul. 22, 2014

(86) PCT No.: PCT/CN2014/082749
§ 371 (c)(1),
(2) Date: Jan. 27, 2016

(87) PCT Pub. No.: WO2015/014226
PCT Pub. Date: Feb. 5, 2015

(65) Prior Publication Data
US 2016/0182195 A1    Jun. 23, 2016

(30) Foreign Application Priority Data
Jul. 31, 2013  (CN) .......................... 2013 1 0327426

(51) Int. Cl.
*H04L 12/911* (2013.01)
*H04L 25/02* (2006.01)
*H04L 27/26* (2006.01)

(52) U.S. Cl.
CPC .......... *H04L 47/70* (2013.01); *H04L 25/0204* (2013.01); *H04L 27/2647* (2013.01)

(58) Field of Classification Search
None
See application file for complete search history.

(56) References Cited

U.S. PATENT DOCUMENTS

| | | | |
|---|---|---|---|
| 5,805,806 A | | 9/1998 | McArthur |
| 6,098,111 A | * | 8/2000 | Maegawa ............... H04L 29/06 709/201 |

(Continued)

FOREIGN PATENT DOCUMENTS

| | | |
|---|---|---|
| CN | 101384093 A | 3/2009 |
| CN | 101764778 A | 6/2010 |

(Continued)

OTHER PUBLICATIONS

Chinese Office Action dated Jan. 25, 2017 for CN Application No. 201310327426.3; 4 pgs.

(Continued)

*Primary Examiner* — Bunjob Jaroenchonwanit
(74) *Attorney, Agent, or Firm* — Cantor Colburn LLP; Rabin Bhattacharya

(57) ABSTRACT

Embodiments include methods and apparatuses for allocating computing elements in a data receiving link. Aspects include receiving baseband data in the data receiving link and allocating a computing element from a resource pool of computing elements for converting the baseband data to transmission block data.

18 Claims, 7 Drawing Sheets

(56) References Cited

U.S. PATENT DOCUMENTS

| | | | |
|---|---|---|---|
| 7,739,718 B1* | 6/2010 | Young | H04L 12/2809 725/127 |
| 8,000,735 B1* | 8/2011 | Barclay | H04W 88/02 455/418 |
| 2004/0213334 A1 | 10/2004 | Ledvina et al. | |
| 2006/0234628 A1* | 10/2006 | Horiguchi | H04L 1/0006 455/39 |
| 2007/0030917 A1* | 2/2007 | Farag | H03M 13/2957 375/265 |
| 2007/0214402 A1* | 9/2007 | Heiman | H03M 13/19 714/781 |
| 2008/0075033 A1* | 3/2008 | Shattil | H04B 7/026 370/328 |
| 2009/0119088 A1* | 5/2009 | Ferris | G06F 17/5022 703/23 |
| 2009/0154379 A1* | 6/2009 | Hayashi | H04W 72/04 370/280 |
| 2009/0225889 A1* | 9/2009 | Tsai | H04L 1/0065 375/267 |
| 2010/0070641 A1* | 3/2010 | Allen | G06F 15/16 709/230 |
| 2010/0153429 A1* | 6/2010 | Xu | G06F 17/30418 707/769 |
| 2010/0153618 A1* | 6/2010 | Mathieson | G06F 13/385 711/102 |
| 2010/0265851 A1* | 10/2010 | Shahar | H04W 84/042 370/278 |
| 2011/0053588 A1* | 3/2011 | Al-Khudairi | H04W 36/30 455/424 |
| 2011/0085673 A1* | 4/2011 | Lee | H01R 24/58 381/74 |
| 2011/0173434 A1* | 7/2011 | Buckley | H04L 65/1016 713/150 |
| 2011/0201340 A1* | 8/2011 | Lunden | H04W 48/20 455/447 |
| 2011/0285912 A1* | 11/2011 | Zhou | H04N 5/44 348/660 |
| 2011/0292976 A1* | 12/2011 | Sen | H04B 1/38 375/219 |
| 2012/0023309 A1* | 1/2012 | Abraham | G06F 11/00 712/30 |
| 2012/0147989 A1* | 6/2012 | Murakami | H04B 7/0413 375/295 |
| 2012/0257117 A1* | 10/2012 | Freundlich | H04N 21/2381 348/723 |
| 2013/0017852 A1 | 1/2013 | Liu et al. | |
| 2013/0039206 A1 | 2/2013 | Borran et al. | |
| 2013/0170353 A1* | 7/2013 | Liu | H04W 28/0289 370/235 |
| 2014/0031049 A1* | 1/2014 | Sundaresan | H04W 16/02 455/447 |
| 2014/0089368 A1* | 3/2014 | Shen | G06F 17/142 708/404 |
| 2014/0119342 A1* | 5/2014 | Tomoe | H04L 45/00 370/331 |
| 2014/0162589 A1* | 6/2014 | Gupta | H04W 64/003 455/404.2 |
| 2014/0195716 A1* | 7/2014 | Bentz | G06F 12/0223 711/102 |
| 2014/0247792 A1* | 9/2014 | Wang | H04W 28/16 370/329 |
| 2014/0301269 A1* | 10/2014 | Cai | H04L 12/18 370/312 |
| 2014/0328178 A1* | 11/2014 | Haberland | H04W 28/08 370/235 |
| 2015/0040131 A1* | 2/2015 | Shan | G06F 9/5027 718/1 |
| 2015/0139181 A1* | 5/2015 | Cheng | H04W 36/14 370/331 |
| 2015/0189692 A1* | 7/2015 | Portolan | H04J 3/0661 370/338 |
| 2016/0139639 A1* | 5/2016 | Dash | G06F 1/26 714/773 |
| 2016/0261326 A1* | 9/2016 | Barker | H04B 7/0617 |
| 2017/0031706 A1* | 2/2017 | Podvratnik | G06F 9/5027 |
| 2017/0126458 A1* | 5/2017 | Shattil | H04L 27/2628 |

FOREIGN PATENT DOCUMENTS

| | | |
|---|---|---|
| CN | 101895367 A | 11/2010 |
| CN | 102004803 A | 4/2011 |
| CN | 102186203 A | 9/2011 |
| CN | 102438338 A | 5/2012 |
| EP | 2375803 A1 | 12/2011 |
| WO | 03005760 A1 | 1/2003 |
| WO | 2013048526 A1 | 4/2013 |

OTHER PUBLICATIONS

Chinese Search Report for Application No. CN2013103274263; dated Jan. 16, 2017; 2 pgs.

Alqahtani et al., "Adaptive Radio Resource Management for Multi-Operator WCDMA Based Cellular Wireless Networks with Heterogeneous Traffic" IEEE Xplore Digital Library; Abstract; 2006 IEEE 17th International Symposium on Sep. 11-14, 2006; 2 pgs.

China Mobile Research Institute—White Paper—"C-RAN The Road Towards Green RAN" Version 2.5 (Oct. 2011), pp. 1-48.

International Search Report for International Application No. PCT/CN2014/082749; dated Nov. 4, 2014; 4 pgs.

Written Opinion of the International Searching Authority for International Application No. PCT/CN2014/082749; dated Nov. 4, 2014; 4 pgs.

* cited by examiner

COMPUTING ELEMENT ALLOCATION IN DATA RECEIVING LINK

This is a U.S. national stage of application No. PCT/CN2014/082749, filed on Jul. 22, 2014. Priority under 35 U.S.C. § 119(a) and 35 U.S.C. § 365(b) is claimed from Chinese Patent Application No. 201310327426.3, filed Jul. 31, 2013, and all the benefits accruing therefrom under 35 U.S.C. § 119, the contents of which in its entirety are herein incorporated by reference.

BACKGROUND

Various embodiments of the present invention relate to data processing, and more specifically, to a method and apparatus for allocating computing elements in a data receiving link.

With the development of wireless communication technology, considerable progress has been achieved in both hardware and software in a communication system. As a result, a wireless communication network can provide increasingly high transmission bandwidths, and transmission delays in the wireless communication network are reduced greatly. Technological advances bring about many conveniences to massive users and can support various applications in a mobile terminal. With respect to a mobile terminal, as its data processing capacity grows stronger, requirements on real time transmission of data by various application programs installed on the mobile terminal also tend to get higher. In the meanwhile, the number of mobile terminal users increases constantly. Therefore, high requirements are imposed on the data processing capacity of a wireless network.

A device (e.g. a receiver, etc.) in an existing wireless communication network is usually implemented based on a dedicated hardware device, which may include, for example, a dedicated chip, an adaptor, an accelerator, etc; moreover, it is possible to involve a dedicated digital signal processing (DSP) circuit and/or a field programmable gate array (FPGA), etc. Although the receiver may further include software processing modules, since these software processing modules are developed based on dedicated hardware devices, they cannot use a parallel data processing algorithm supported by a general-purpose processor.

It should be understood that with the increase of a general-purpose computer hardware processing capacity, techniques such as a multi-core processor and a computer cluster provide strong physical support for parallel data processing, and the parallel data processing capacity based on general-purpose processors has been improved by a large margin. Regarding the wireless communication field, although dedicated hardware architectures in communication devices have made huge contribution to the data processing capacity improvement, they restrict to some extent the application of general-purpose parallel data processing algorithms. In view of the status quo and development trend, it becomes a brand-new research area as to how to introduce into wireless communication devices a general-purpose data processor and further a general-purpose parallel data processing algorithm. At this point, how to schedule these computing elements and further enhance the data processing efficiency becomes a focus of attention.

SUMMARY

In one embodiment of the present invention, there is provided a method for allocating computing elements in a data receiving link, comprising: receiving baseband data in the data receiving link; allocating a computing element from a resource pool of computing elements for converting the baseband data to transmission block data, wherein a general-purpose processor converts the baseband data to the transmission block data, and wherein the computing element is a computing element that can be called by the general-purpose processor.

In one embodiment of the present invention, there is provided an apparatus for allocating computing elements in a data receiving link, comprising: a receiving module configured to receive baseband data in the data receiving link; an allocating module configured to allocate a computing element from a resource pool of computing elements for converting the baseband data to transmission block data, wherein a general-purpose processor converts the baseband data to the transmission block data, and wherein the computing element is a computing element that can be called by the general-purpose processor.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
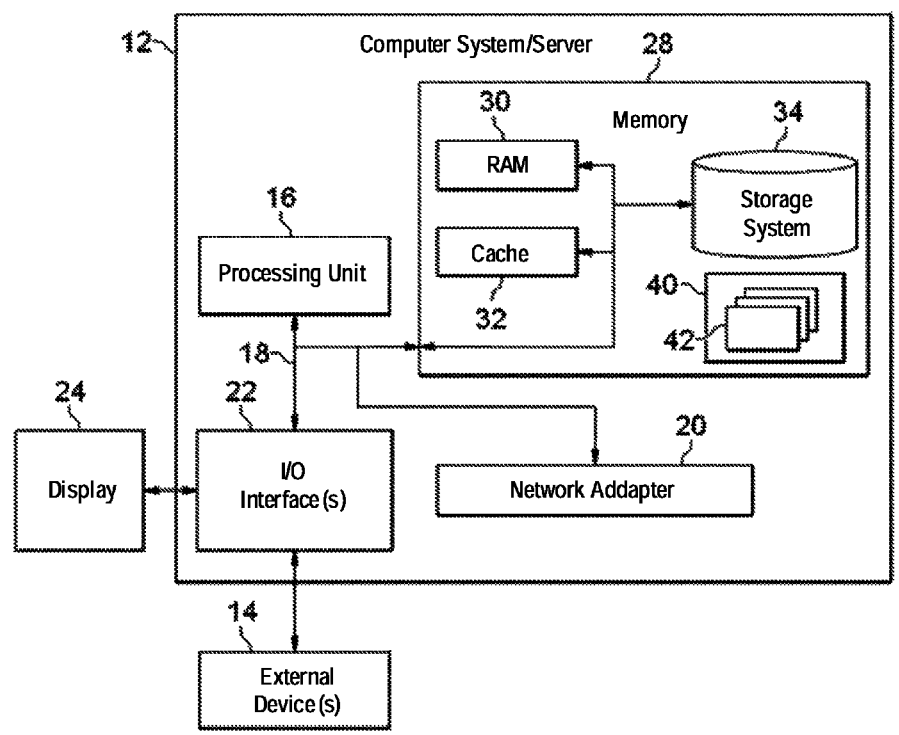
FIG. 1 schematically shows a block diagram of an exemplary computer system which is applicable to implement the embodiments of the present invention.

Various embodiments will be described in more detail with reference to the accompanying drawings, in which the embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, in some embodiments, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated data signal may take any of a variety of forms, including, but not limited to, an electromagnetic signal, optical signal, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instruction means which implements the function/act specified in the flowchart and/or block diagram block or blocks.

The computer program instructions may also be loaded onto a computer, other programmable data processing apparatus, or other devices to cause a series of operational steps to be performed on the computer, other programmable data processing apparatus or other devices to produce a computer implemented process such that the instructions which execute on the computer or other programmable apparatus provide processes for implementing the functions/acts specified in the flowchart and/or block diagram block or blocks.

Referring now to FIG. 1, in which a block diagram of an exemplary computer system/server 12 which is applicable to implement the embodiments of the present invention is shown. Computer system/server 12 shown in FIG. 1 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 and processing units 16.

Bus 18 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown in FIG. 1 and typically called a "hard drive"). Although not shown in FIG. 1, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
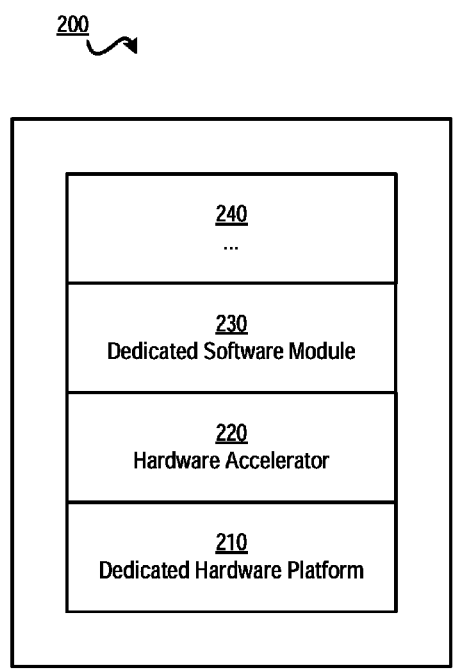
FIG. 2 schematically shows an architecture diagram of a receiver in uplink data communication according to one solution.

How to implement a method and apparatus described in the present invention will be schematically illustrated below by only taking a receiver involved in uplink data transmission as an example. FIG. 2 schematically shows an architecture diagram of a receiver 200 in uplink data communication according to one solution. Note not all modules of a conventional receiver are shown in the receiver in FIG. 2, but a typical structure of a receiver is shown schematically. Receiver 200 may comprise: a dedicated hardware platform 210 that, for example, may include a rack, a chassis, a power supply, etc.; a dedicated hardware accelerator 220, and a dedicated software module 230 implemented based on dedicated hardware platform 210 and dedicated hardware accelerator 220; or may further comprise other module 240. Receiver 200 should have high data throughput capacity and "real-time processing" capacity. For example, the time overhead for processing received signals should be at a magnitude order of 1 ms.

Figure 3:
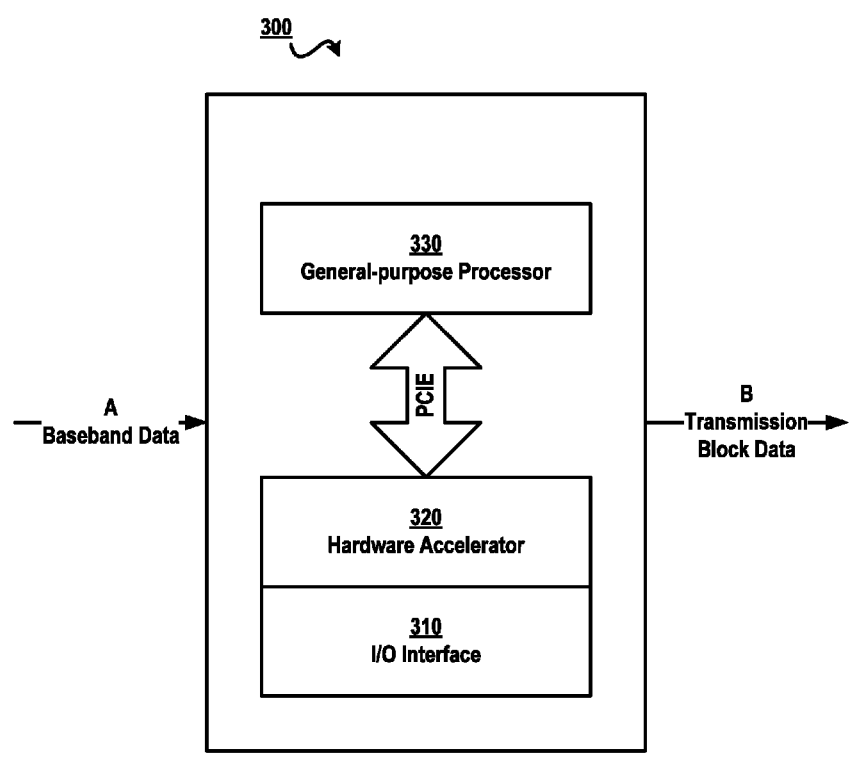
FIG. 3 schematically shows an architecture diagram of a receiver in uplink data communication according to one embodiment of the present invention.

FIG. 3 schematically shows an architecture diagram 300 of a receiver in data communication according to one embodiment of the present invention. In this embodiment, parallel data processing is implemented based on a general-purpose processor, and there is provided a technical solution for allocating computing elements in a data receiving link. As shown in FIG. 3, there are comprised: an I/O interface 310 for communicating with an antenna system; a hardware accelerator 320 for processing data that are related to I/O data and/or that are computation-sensitive; and a general-purpose processor 330, which may, like a multi-core CPU in an ordinary computer, be used for processing data transmitted via a PCIE interface. In this embodiment, I/O interface 310 may, for example, receive baseband data (as shown by arrow A) corresponding to antennas and output transmission block data (as shown by arrow B) for other data processing apparatus to process subsequently.

In hardware of an existing base station, computing elements may be dedicated hardware developed with respect to specific processing modules. Thus, these dedicated hardware only can be reused among identical processing modules in a receiving link; even if computing elements of certain hardware A are sufficient and computing elements of other hardware B are short, hardware B cannot call computing elements of hardware A. That is, in existing base stations, computing elements only serve specific hardware modules but cannot be shared among various modules. Therefore, existing base stations combining DSP and FPGA cannot adaptively allocate computing elements according to demands for computing elements in various data processing stages.

Unlike technical solutions based on dedicated hardware (or combining hardware modules and software modules) in the prior art, the various embodiments of the present invention implement virtual base stations based on a general-purpose processing platform. Underlying computing elements are computing elements (e.g. may comprise various levels of memories, cores in CPU, etc.) that can be called by a general-purpose processor, and these computing elements are uniformly managed and scheduled in a resource pool of computing elements; in addition, computing elements in the resource pool of computing elements can be shared among processing modules that implement various steps of a method according to the present invention.

Based on the structure as shown in FIG. 3, the general-purpose processor calls a computing element (e.g. CPU and memories, etc.) in the resource pool of computing elements to process data. Specifically, in one embodiment of the present invention there may be provided a method for allocating computing elements in a data receiving link, comprising: receiving baseband data in the data receiving link; allocating a computing element from a resource pool of computing elements for converting the baseband data to transmission block data, wherein a general-purpose processor converts the baseband data to the transmission block data, and wherein the computing element is a computing element that can be called by the general-purpose processor.

Figure 4:
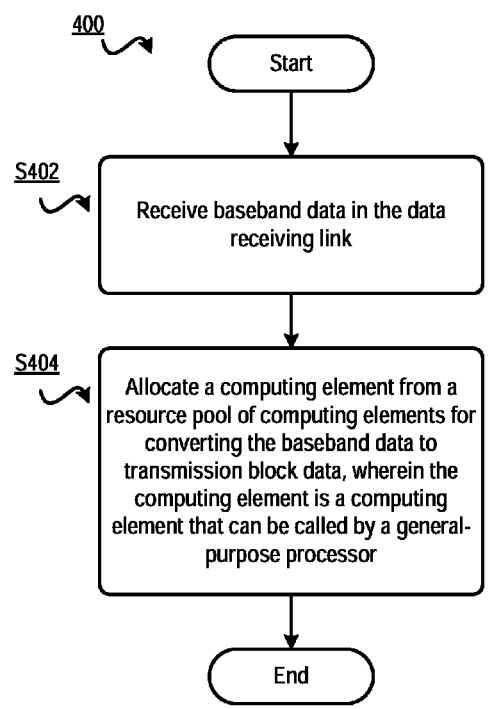
FIG. 4 schematically shows a flowchart of a method for allocating a computing element in a data receiving link according to one embodiment of the present invention.

FIG. 4 schematically shows a flowchart 400 of a method for allocating computing elements in a data receiving link according to one embodiment of the present invention. As shown at block S402, baseband data in the data receiving link are received. In this embodiment, I/O interface 310 as shown in FIG. 3 may be employed for implementation. In exemplary embodiments, data from multiple antennas may be radio-frequency signals, which are converted to baseband data through a remote radio head (RRH) and an RRH adaptor.

As shown at block S404, a computing element in a resource pool of computing elements is allocated for converting the baseband data to transmission block data, wherein the computing element is a computing element that can be called by a general-purpose processor.

In this embodiment, the method shown in FIG. 4 may be implemented in a general-purpose processor. The general-purpose processor may comprise, for example, a central processing unit (CPU), and the CPU may comprise multiple processing units. An example of the CPU is, for example, a double-core, 4-core, or 8-core CPU. Only for the purpose of illustration, when a general-purpose processor with 4 processor cores is employed, the frequency-domain signals may be processed in parallel by the 4 processor cores.

Note although a device comprising a multi-core CPU is used as an exemplary embodiment of the general-purpose processor, those skilled in the art should understand that other computer device may be selected based on a concrete implementation environment. For example, a physical machine and/or a virtual machine may be selected as the general-purpose processor, or a computer device such as a computer cluster may be employed, so long as the computer device is capable of parallel processing and has computing elements that can be shared among multiple function modules.

In one embodiment of the present invention, the process of converting the baseband data to transmission block data may be divided into multiple stages. For example, these stages may comprise a conversion process as below: baseband data→ frequency-domain data→ receipt data symbols, channel estimation symbols→ estimated values of an original code stream→ transmission code blocks→ transmission block data. In addition, since the various embodiments of the present invention employ the general-purpose processor for calling a shareable computing element in a resource pool of computing elements, how to determine the number of computing elements needed in each stage after dividing the data processing into multiple stages becomes a critical factor when processing data in the data receiving link.

In one embodiment of the present invention, the concept of workload parameter P is introduced, which parameter describes the total number of computing elements needed in each stage when a general-purpose processor process data objects. Since the workload of each stage differs, the total number of computing elements being needed is also different. When the total number of computing elements needed in each stage is determined, computing resources can be scheduled independently with respect to each stage.

Specifically, in one embodiment of the present invention, the allocating a computing element from a resource pool of computing elements for converting the baseband data to transmission block data comprises: identifying the baseband data as data objects; in a current stage of multiple stages, retrieving a workload parameter P associated with the data objects, wherein the workload parameter P describes the total number of necessary computing elements when the general-purpose processor processes the data objects; and allocating the total number of computing elements in the resource pool of computing elements for converting the data objects to data objects used for a next stage.

Figure 5:
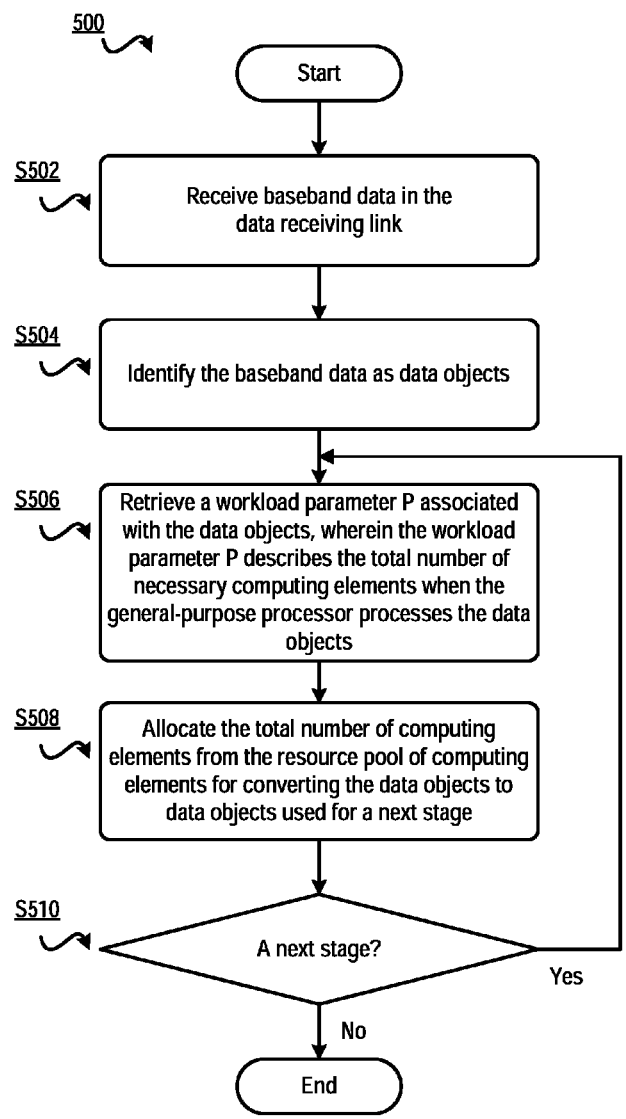
FIG. 5 schematically shows a flowchart of multiple stages of a method for allocating a computing element in a data receiving link according to one embodiment of the present invention.

With reference to FIG. 5 now, description is presented to concrete operations in each stage. FIG. 5 schematically shows a flowchart 500 of multiple stages of a method for allocating a computing element in a data receiving link according to one embodiment of the present invention, wherein block S504 to S510 are refined representation of block S404 shown in FIG. 4.

The receiving operation, as shown in block S502, is similar to the operation, as shown in block S402, and thus is not detailed here. As shown at block S504, the baseband data are identified as data objects. Note data objects in the various embodiments of the present invention are specific to each stage, and in each stage input data are data objects in a current stage and output data are data objects used for a next stage. For example, concerning the conversion stage "baseband data→ frequency-domain data," the baseband data are data objects in a current stage, while the frequency-domain data resulting from conversion are data objects used for a next stage.

As shown at block S506, according to the conversion process described above, each stage a workload parameter P of a current stage may be determined. Subsequently, as shown in block S508, a required number of computing elements are allocated from the resource pool of computing elements for implementing conversion in the current stage, i.e. the total number of computing elements, are allocated from the resource pool of computing elements for converting the data objects to data objects used for a next stage. After each conversion stage, as shown in block S510 it may be checked whether or not there exists a next stage; if yes (the judgment result is "Yes") the operation flow returns to block S506; otherwise the operation flow ends. Those skilled in the art should understand for the last stage among multiple stages, it may consider a next stage is null, at which point data resulting from conversion are transmission data blocks.

In one embodiment of the present invention, the retrieving a workload parameter P associated with the data objects comprises: calculating the workload parameter P=N*M based on the minimum number N of computing elements needed for processing one basic processing unit of the data objects and the number M of the basic processing units comprised in the data objects.

Since data objects in different stages differ, basic processing units involved in processing the data objects also differ. Specifically, in the conversion stage "baseband data→ frequency-domain data" for example, system bandwidths in single-sector single-antenna mode may be used as basic processing units. Since the number (e.g. denoted as the minimum number N) of computing elements needed for processing basic processing units can be estimated, as long as the number (e.g. M) of basic processing units comprised in data objects can be learned, the number of computing elements needed for processing all data can be learned, i.e. P=N*M.

Figure 6:
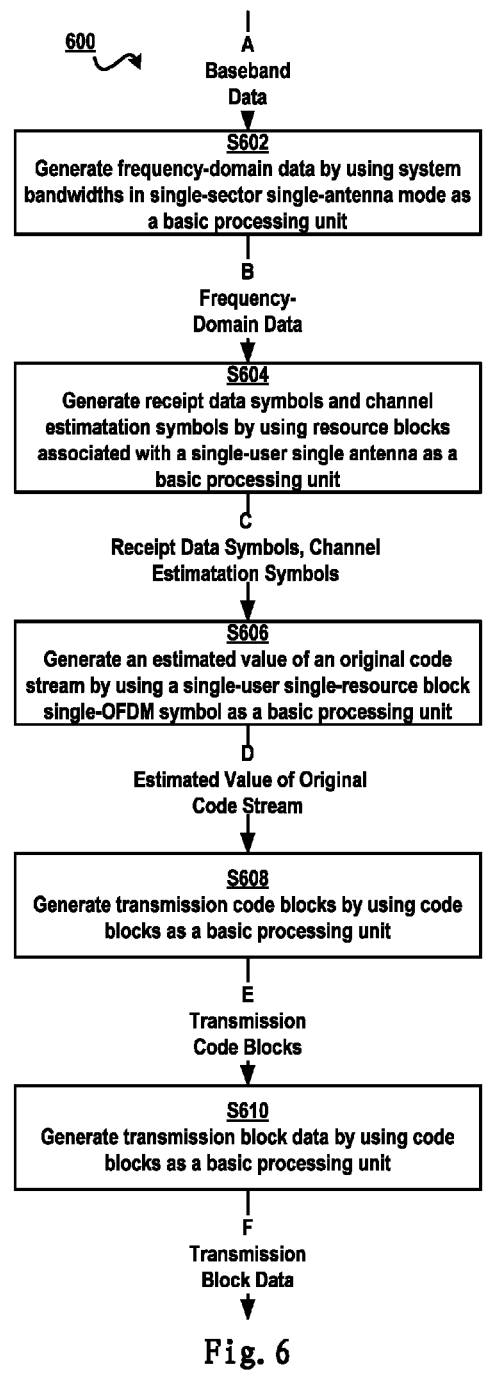
FIG. 6 schematically shows a flowchart of multiple stages of processing data in a data receiving link according to one embodiment of the present invention.

With reference to FIG. 6 now, detailed description is presented to concrete operations in each stage. FIG. 6 schematically shows a flowchart 600 of multiple stage of processing data in a data receiving link according to one embodiment of the present invention.

Block S602 illustrates operations in a conversion stage (first stage) from baseband data (as shown by arrow A) to frequency-domain data (as shown by arrow B). Specifically, a fast Fourier transform (FFT) algorithm may be used to convert time-domain signals associated with the baseband data to frequency-domain signals. Those skilled in the art may implement concrete conversion based on the design principle of the FFT algorithm, which is not detailed in this disclosure.

In one embodiment of the present invention, the above operations may be realized by the general-purpose processor calling necessary computing elements. In a first stage among multiple stages, the data objects are the baseband data, and the calculating the workload parameter P=N*M comprises: estimating the minimum number N based on system bandwidths Bw in single-sector single-antenna more associated with the baseband data; and calculating the number of the basic processing units $M=\Sigma_{i=1}^{S} A_i$ comprised in the data objects based on the number S of sectors associated with the data objects and the number $A_i$ of antennas in each sector.

In the first stage, as far as LTE is concerned, the amount of computation is related to the number of sectors and the number of antennas in each sector, and they are in a linear relationship. Therefore, as long as the number of sectors and the number of corresponding antennas can be learned in advance, the total number of necessary computing elements can be pre-estimated, and further necessary computing elements can be obtained so as to adaptively schedule computing resources. With respect to an actual network, the number of sectors and the number of corresponding antennas do not frequently change except when the network configuration changes, so it is feasible to calculate necessary computing elements based on the number of sectors and the number of corresponding antennas. The number of necessary computing elements can be calculated based on the formula P=N*M, and a necessary number of computing elements are called to perform operations in the first stage.

Note in the various embodiments of the present invention, based on the idea of parallel data processing, in each stage to-be-processed signals are divided into multiple groups that can be processed in parallel, and the multiple groups are processed in parallel without mutual interference by using multiple processor cores, thereby increasing the data processing efficiency.

Note the processing time of each processor core may differ, and the number of processor cores might not match the number of antennas perfectly. Therefore, there may exist a situation where multiple processor cores do not implement processing completely in parallel. In fact, processing times of various processor cores might overlap to some extent, but do not necessarily start and/or end at the same time. To ensure a subsequent operation is executed after completion of a processor core with the lowest processing speed, processing results from various processor cores may be written to a data buffer, and may further be synchronized using an additional operation (e.g. barrier operation).

Block S604 illustrates operations in a conversion stage (second stage) from frequency-domain data (as shown by arrow B) to receipt data symbols and channel estimation symbols (as shown by arrow C). Specifically, frequency-domain signals are divided into multiple parallel groups based on multiple antennas corresponding to the frequency-domain signals; and multiple data carrier symbols and multiple channel estimation symbols are obtained at least partially in parallel from the multiple parallel groups as data objects used for a next stage. In this embodiment, the general-purpose processor may call computing resources to process in parallel data from the multiple antennas, so as to obtain a desired result.

More specifically, it is possible to implement user separation so as to obtain carrier symbols and reference signals from the multiple parallel groups; remove inter carrier interference from the carrier symbols and the reference signals so as to form the data carrier symbols and offset-corrected reference symbols, respectively; and perform channel estimate on the offset-corrected reference symbols so as to form the multiple channel estimation symbols. The general-purpose processor calls computing elements in the resource pool of computing elements to implement this process.

In the second stage among multiple processing stages, the data objects are frequency-domain data, and the calculating workload parameter P=N*M comprises: estimating the minimum number N based on a workload needed by resource blocks associated with a single antenna of a single user among the frequency-domain signals; and calculating the number of basic processing units comprised in the data objects based on the user number I in each sector associated with the frequency-domain data, the antenna number $A_i$ of each user and the number $R_i$ of allocated resource blocks, wherein S is the number of sectors associated with the data objects.

As far as a receiver is concerned, processing in various stages is a process of serial processing in succession. For example, in the first stage the upper limit of computing resources needed in the first stage has been estimated based on the number of sectors and the number of corresponding antennas. In the second stage, the number of users calling radio resources is usually less than the system's maximum capacity, and computing resources being needed may be estimated according to bandwidths being actually allocated. In other words, computing resources being needed are the sum of bandwidths allocated to all users in the same TTI (transmission time interval).

In LTE, the basic unit of bandwidth allocation is resource blocks (RB), so the total number of RBs the receiver has to process in this stage may be calculated according to bandwidths allocated to all users. Computing elements needed for processing each RB may be estimated, and further computing elements needed in the second stage may be estimated based on the user number, the number of RBs allocated to these users and the number of antennas used by these users for multi-antenna receiving. Afterwards, the number of necessary computing elements may be calculated based on the formula P=N*M, and a necessary number of computing elements are called to perform operations in the second stage.

Block S606 illustrates operations in a conversion stage (third stage) from receipt data symbols and channel estimation symbols (as shown by arrow C) to estimated value of an original code stream (as shown by arrow D). Specifically, channel equation and multiple antennas combination is performed with respect to the multiple data carrier symbols and the multiple channel estimation symbols so as to form multiple effective frequency-domain symbols as multiple parallel groups; and an estimated value of an original code stream is obtained at least partially in parallel from the multiple effective frequency-domain symbols as data objects used for a third stage. In this embodiment, the general-purpose processor calls computing elements to process in parallel multiple parallel groups so as to obtain a desired result. More specifically, the at least partially in parallel obtaining an estimated value of an original code stream from the multiple effective frequency-domain symbols comprises: converting the multiple effective frequency-domain symbols into time-domain signals; and performing constellation demodulation with respect to the time-domain signals so as to obtain an estimated value of an original code stream.

In this embodiment, in the third stage among multiple processing stages, the data objects are data carrier symbols and channel estimation symbols, and the calculating the workload parameter P=N*M comprises: estimating the minimum number N based on the data amount of the data carrier symbols and channel estimation symbols on a single OFDM (orthogonal frequency division multiplexing) symbol in a single resource block of a single user; and calculating the number $$M = \sum_{s=1}^{S} \sum_{i=1}^{I_s} (A_i * R_i)$$

$$M = \sum_{s=1}^{S} \sum_{i=1}^{I_s} (R_i * F_i)$$

of basic processing units comprised in the data objects based on the user number $I_s$ in each sector associated with frequency-domain data, the number $R_i$ of allocated resource blocks and the number $F_i$ of OFDM symbols, wherein S is the number of sectors associated with the data objects. Generally, an OFDM symbol is a basic time unit within a subframe in the OFDM system, for details of the OFDM symbol, please refer to the IEEE technical specification.

The processing in the third stage is similar to that in the second stage described above. The only difference lies in: computing resources in the second stage involve multiple antennas, so the number of receive antennas should be considered when estimating the number of computing elements; in the third stage, however, signals of the same user but from different antennas will be merged, so only the user number is considered when estimating the number of computing elements. Next, the number of necessary computing elements may be calculated based on the formula P=N*M, and a necessary number of computing elements are called to perform operations in the third stage.

Block S608 illustrates operations in a conversion stage (fourth stage) from estimated value of an original code stream (as shown by arrow D) to transmission code blocks (as shown by arrow E). Specifically, multiple code blocks are extracted from the estimated value of the original code stream as multiple parallel groups; and transmission code blocks are restored at least partially in parallel from the multiple code blocks. In this embodiment, the general-purpose processor may call computing elements to in parallel process the multiple parallel groups, so as to obtain a desired result. For example, channel de-interleaving, rate de-matching and hybrid repeat mode combination may be performed with respect to the multiple code blocks so as to restore transmission code blocks.

In one embodiment of the present invention, in the fourth stage among multiple processing stages, the data objects are an estimated value of an original code stream, and the calculating the workload parameter P=N*M comprises: estimating the minimum number N based on the maximum data amount of code blocks associated with an estimated value of an original code stream; and calculating the number $$M = \sum_{s=1}^{S} \sum_{i=1}^{I_s} C_i$$

of basic processing units comprised in the data objects based on the user number $I_s$ in each sector associated with the estimated value of the original code stream and the number $C_i$ of code blocks of each user, wherein S is the number of sectors associated with the data objects.

In this stage, the minimum processing unit of the receiver is code blocks, and the total computation load may be estimated according to the number of code blocks. In addition, since there are various types of code blocks, the sizes of code blocks also vary. Therefore, the number of computing elements needed for processing one basic processing unit may be estimated based on the longest code block. In this stage, the total number of code blocks is associated with the user number $I_s$ in each sector and the number $C_i$ of code blocks of each user, so the total number of code blocks $$M = \sum_{s=1}^{S} \sum_{i=1}^{I_s} C_i.$$

Subsequently, the number of necessary computing elements may be calculated based on the formula P=N*M, and a necessary number of computing elements are called to perform operations in the fourth stage.

Block S610 illustrates operations in a conversion stage (fifth stage) from transmission code blocks (as shown by arrow E) to transmission block data (as shown by arrow F). Specifically, transmission code blocks are decoded based on a decoding algorithm; and decoded code blocks are combined to form transmission block data. In practical implementation, decoding may be implemented using a Turbo decoding method so as to generate decoded code blocks. Afterwards, cyclic redundancy check (CRC) may be performed on the decoded code blocks so as to verify whether the code blocks are transmitted correctly or not. After combining the decoded code blocks into transmission block data, CRC check may be performed on the transmission block data so as to verify whether the transmission block data are transmitted correctly or not. Since each transmission block is composed of one or more code blocks, after performing CRC check on each code block, CRC check is performed on the transmission block, so it may be verified whether data in the entire transmission block are transmitted correctly or not.

In one embodiment of the present invention, in the fifth stage among multiple processing stages, the data objects are transmission code blocks, and the calculating the workload parameter P=N*M comprises: estimating the minimum number N based on the maximum data amount of code blocks associated with the transmission code blocks; and calculating the number $$M = \sum_{s=1}^{S} \sum_{i=1}^{I_s} C_i$$

of basic processing units comprised in the data objects based on the user number $I_s$ in each sector associated with an estimated value of an original code stream and the number $C_i$ of code blocks of each user, wherein S is the number of sectors associated with the data objects.

Like the fourth stage, the basic processing unit in the fifth stage is also code blocks. However, the number of necessary computing elements depends upon the total number of code blocks to be processed, so the total number of code blocks may be used as the number M of basic processing units for subsequent calculation. Next, the number of necessary computing elements may be calculated based on the formula P=N*M, and a necessary number of computing elements are called to perform operations in the fifth stage.

In the various embodiments of the present invention, although the five stages have different demands for computing resources, such common features exist among the various stages: on the one hand, each stage requires one or more physical layer parameters (such as the number of sectors and the number of corresponding antennas in the first stage, the user number in each sector and the antenna number of each user in the second stage, etc.) as triggering information for estimating necessary computing elements; on the other hand, each stage has its own basic processing units and the minimum number of computing elements needed for processing the basic processing units. In each stage, the total number of necessary computing elements can be estimated based on these features. Then, computing elements in the resource pool of computing elements are allocated reasonably, thereby achieving objectives of saving power and/or balancing loads.

In one embodiment of the present invention, the allocating the total number of computing elements from the resource pool of computing elements for converting the data objects to data objects used for a next stage comprises: in response to the total number of computing elements in the resource pool of computing elements being greater than or equal to the workload parameter P, allocating computing elements from the resource pool of computing elements for converting the data objects to data objects used for a next stage.

Specifically, a resource list may be used to maintain information on available resources in the resource pool of computing elements. Since in the embodiments of the present invention the general-purpose processor executes processing operations in respective stages in parallel, information in the resource list may change dynamically. For example, at a moment T1 a case as below may occur: the resource list comprises n idle computing elements, and at this point 10 computing elements are executing operations in the first stage, 20 computing elements are executing operations in the second stage. At a moment T2, suppose operations in the first stage are completed and the 10 computing elements being occupied are released, then at this point the number of idle computing elements is updated as (n+10).

In one embodiment of the present invention, the allocating computing elements from the resource pool of computing elements for converting the data objects to data objects used for a next stage in response to the total number of computing elements in the resource pool of computing elements being greater than or equal to the workload parameter P comprises at least one of: allocating computing elements from a single server in the resource pool of computing elements; and allocating computing elements from multiple servers in the resource pool of computing elements.

Those skilled in the art may design different allocation policies based on different objectives. For example, when the objective is to save power, first computing elements in one server may be allocated as much as possible, and when the number of idle computing elements in this server is less than the requested number of computing elements, another server is activated for resource allocation. For another example, when the objective is to balance loads, it is possible to equally allocate computing elements from various servers as much as possible, so as to balance workloads of the various servers.

By means of the method described above, it is possible to call computing elements based on the general-purpose processor, for process in parallel received data in the data receiving link. In this manner, it is possible to increase the processing efficiency of the receiver and reduce overheads for developing dedicated hardware and/or software. In addition, computing elements are uniformly maintained by the resource pool of computing elements, and in the data receiving link, computing elements can be shared among various stages of data processing, so as to enhance the utilization efficiency of computing resources and accomplish the objectives of power saving and/or load balancing.

Figure 7:
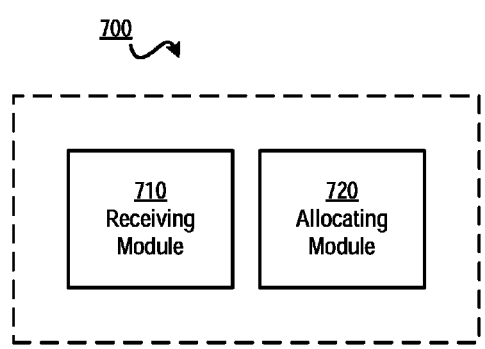
FIG. 7 schematically shows a block diagram of an apparatus for allocating a computing element in a data receiving link according to one embodiment of the present invention.

FIG. 7 schematically shows a block diagram 700 of an apparatus for allocating a computing element in a data receiving link according to one embodiment of the present invention. Specifically, FIG. 7 shows an apparatus for allocating a computing element in a data receiving link, comprising: a receiving module 710 configured to receive baseband data in the data receiving link; and an allocating module 720 configured to allocate a computing element from a resource pool of computing elements for converting the baseband data to transmission block data, wherein a general-purpose processor converts the baseband data to the transmission block data, and wherein the computing element is a computing element that can be called by the general-purpose processor.

Specifically, in one embodiment of the present invention, allocating module 720 comprises: an identifying module configured to identify the baseband data as data objects; a retrieving module configured to in a current stage of multiple stages, retrieve a workload parameter P associated with the data objects, wherein the workload parameter P describes the total number of necessary computing elements when the general-purpose processor processes the data objects; and a resource allocating module configured to allocate the total number of computing elements from the resource pool of computing elements for converting the data objects to data objects used for a next stage.

In one embodiment of the present invention, the retrieving module comprises: a calculating module configured to calculate the workload parameter P=N*M based on the minimum number N of computing elements needed for processing one basic processing unit of the data objects and the number M of the basic processing units comprised in the data objects.

In one embodiment of the present invention, the current stage is a first stage, the data objects are the baseband data, and the calculating module comprises: a first estimating module configured to estimate the minimum number N based on system bandwidths in single-sector single-antenna more associated with the baseband data; and a first calculating module configured to calculate the number of the basic processing $M=\Sigma_{i=1}^{S} A_i$ units comprised in the data objects based on the number S of sectors associated with the baseband data and the number $A_i$ of antennas in each sector.

In one embodiment of the present invention, the current stage is a second stage, the data objects are frequency-domain data, and the calculating module comprises: a second estimating module configured to estimate the minimum number N based on a workload needed by resource blocks associated with a single antenna of a single user among the frequency-domain signals; and a second calculating module configured to calculate the number $$M = \sum_{s=1}^{S} \sum_{i=1}^{I_s} (A_i * R_i)$$

of basic processing units comprised in the data objects based on the user number I in each sector associated with the frequency-domain data, the antenna number $A_i$ of each user and the number of allocated resource blocks, wherein S is the number of sectors associated with the data objects.

In one embodiment of the present invention, the current stage is a third stage, the data objects are data carrier symbols and channel estimation symbols, and the calculating module comprises: a third estimating module configured to estimate the minimum number N based on the data amount of the data carrier symbols and channel estimation symbols on a single OFDM symbol in a single resource block of a single user; and a third calculating module configured to calculate the number $$M = \sum_{s=1}^{S} \sum_{i=1}^{I_s} (R_i * F_i)$$

of basic processing units comprised in the data objects based on the user number $I_s$ in each sector associated with frequency-domain data, the number $R_i$ of allocated resource blocks and the number $F_i$ of OFDM symbols, wherein S is the number of sectors associated with the data objects.

In one embodiment of the present invention, the current stage is a fourth stage, the data objects are an estimated value of an original code stream, and the calculating module comprises: a fourth estimating module configured to estimate the minimum number N based on the maximum data amount of code blocks associated with an estimated value of an original code stream; and a fourth calculating module configured to calculate the number $$M = \sum_{s=1}^{S} \sum_{i=1}^{I_s} C_i$$

of basic processing units comprised in the data objects based on the user number $I_s$ in each sector associated with the estimated value of the original code stream and the number $C_i$ of code blocks of each user, wherein S is the number of sectors associated with the data objects.

In one embodiment of the present invention, the current stage is a fifth stage, the data objects are transmission code blocks, and the calculating module comprises: a fifth estimating module configured to estimate the minimum number N based on the maximum data amount of code blocks associated with the transmission code blocks; and a fifth calculating module configured to calculate the number $$M = \sum_{s=1}^{S} \sum_{i=1}^{I_s} C_i$$

of basic processing units comprised in the data objects based on the user number $I_s$ in each sector associated with an estimated value of an original code stream and the number $C_i$ of code blocks of each user, wherein S is the number of sectors associated with the data objects.

In one embodiment of the present invention, the resource allocating module comprises: a computing element allocating module configured to, in response to the total number of computing elements in the resource pool of computing elements being greater than or equal to the workload parameter P, allocate computing elements from the resource pool of computing elements for converting the data objects to data objects used for a next stage.

In one embodiment of the present invention, the computing element allocating module comprises at least one of: a first allocating module configured to allocate computing elements from a single server in the resource pool of computing elements; and a second allocating module configured to allocate computing elements from multiple servers in the resource pool of computing elements.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for allocating computing elements in a data receiving link, comprising:
    receiving baseband data in the data receiving link; and
    allocating a computing element from a resource pool of computing elements for converting the baseband data to transmission block data by:
        identifying the baseband data as data objects;
        in a current stage of multiple stages,
            retrieving a workload parameter P associated with the data objects, wherein the workload parameter P describes a total number of necessary computing elements when the general-purpose processor processes the data objects; and
            allocating the total number of computing elements from the resource pool of computing elements for converting the data objects to data objects used for a next stage,
    wherein the computing element is a computing element that can be called by a general-purpose processor.

2. The method according to claim 1, wherein the retrieving a workload parameter P associated with the data objects comprises:
    calculating the workload parameter P=N*M based on a minimum number N of computing elements needed for processing one basic processing unit of the data objects and a number M of the basic processing units comprised in the data objects.

3. The method according to claim 2, wherein the current stage is a first stage, the data objects are the baseband data, and wherein the calculating the workload parameter P=N*M comprises:
    estimating the minimum number N based on system bandwidths in single-sector single-antenna more associated with the baseband data; and
    calculating the number of the basic processing units $M = \sum_{i=1}^{S} A_i$ comprised in the data objects based on a number S of sectors associated with the data objects and a number $A_i$ of antennas in each sector.

4. The method according to claim 2, wherein the current stage is a second stage, the data objects are frequency-domain data, and wherein the calculating workload parameter P=N*M comprises:
estimating the minimum number N based on a workload needed by resource blocks associated with a single antenna of a single user among frequency-domain signals; and
calculating a number $$M = \sum_{s=1}^{S} \sum_{i=1}^{I_s} (A_i * R_i)$$

of basic processing units comprised in the data objects based on a user number I in each sector associated with the frequency-domain data, an antenna number $A_i$ of each user and a number $R_i$ of allocated resource blocks, wherein S is a number of sectors associated with the data objects.

5. The method according to claim 2, wherein the current stage is a third stage, the data objects are data carrier symbols and channel estimation symbols, and wherein the calculating the workload parameter P=N*M comprises:
estimating the minimum number N based on a data amount of the data carrier symbols and channel estimation symbols on a single OFDM symbol in a single resource block of a single user; and
calculating the number $$M = \sum_{s=1}^{S} \sum_{i=1}^{I_s} (R_i * F_i)$$

of basic processing units comprised in the data objects based on a user number $I_s$ in each sector associated with frequency-domain data, the number $R_i$ of allocated resource blocks and a number $F_i$ of OFDM symbols, wherein S is a number of sectors associated with the data objects.

6. The method according to claim 2, wherein the current stage is a fourth stage, the data objects are an estimated value of an original code stream, and wherein the calculating the workload parameter P=N*M comprises:
estimating the minimum number N based on the maximum data amount of code blocks associated with an estimated value of an original code stream; and
calculating the number $$M = \sum_{s=1}^{S} \sum_{i=1}^{I_s} C_i$$

of basic processing units comprised in the data objects based on a user number $I_s$ in each sector associated with the estimated value of the original code stream and a number $C_i$ of code blocks of each user, wherein S is a number of sectors associated with the data objects.

7. The method according to claim 2, wherein the current stage is a fifth stage, the data objects are transmission code blocks, and wherein the calculating the workload parameter P=N*M comprises:
estimating the minimum number N based on the maximum data amount of code blocks associated with the transmission code blocks; and
calculating the number $$M = \sum_{s=1}^{S} \sum_{i=1}^{I_s} C_i$$

of basic processing units comprised in the data objects based on a user number $I_s$ in each sector associated with an estimated value of an original code stream and a number $C_i$ of code blocks of each user, wherein S is a number of sectors associated with the data objects.

8. The method according to claim 1, wherein the allocating the total number of computing elements from the resource pool of computing elements for converting the data objects to data objects used for a next stage comprises:
allocating computing elements from the resource pool of computing elements for converting the data objects to data objects used for a next stage in response to the total number of computing elements in the resource pool of computing elements being greater than or equal to the workload parameter P.

9. The method according to claim 8, wherein the allocating computing elements from the resource pool of computing elements for converting the data objects to data objects used for a next stage in response to the total number of computing elements in the resource pool of computing elements being greater than or equal to the workload parameter P comprises at least one of:
allocating computing elements from a single server in the resource pool of computing elements; and
allocating computing elements from multiple servers in the resource pool of computing elements.

10. An apparatus for allocating a computing element in a data receiving link, the apparatus comprising a processor that comprises:
a receiving module configured to receive baseband data in the data receiving link; and
an allocating module configured to allocate a computing element from a resource pool of computing elements for converting the baseband data to transmission block data wherein the allocating module comprises:
an identifying module configured to identify the baseband data as data objects;
a retrieving module configured to in a current stage of multiple stages, retrieve a workload parameter P associated with the data objects, wherein the workload parameter P describes a total number of necessary computing elements when the general-purpose processor processes the data objects; and
a resource allocating module configured to allocate the total number of computing elements from the resource pool of computing elements for converting the data objects to data objects used for a next stage,
wherein the computing element is a computing element that can be called by a general-purpose processor.

11. The apparatus according to claim 10, wherein the retrieving module comprises:
a calculating module configured to calculate the workload parameter P=N*M based on a minimum number N of computing elements needed for processing one basic processing unit of the data objects and a number M of the basic processing units comprised in the data objects.

12. The apparatus according to claim 11, wherein the current stage is a first stage, the data objects are the baseband data, and wherein the calculating module comprises:
a first estimating module configured to estimate the minimum number N based on system bandwidths in single-sector single-antenna more associated with the baseband data; and
a first calculating module configured to calculate the number of the basic processing units $M=\sum_{i=1}^{S} A_i$ comprised in the data objects based on a number S of sectors associated with the baseband data and a number $A_i$ of antennas in each sector.

13. The apparatus according to claim 11, wherein the current stage is a second stage, the data objects are frequency-domain data, and wherein the calculating module comprises:
a second estimating module configured to estimate the minimum number N based on a workload needed by resource blocks associated with a single antenna of a single user among frequency-domain signals; and
a second calculating module configured to calculate a number $$M = \sum_{s=1}^{S} \sum_{i=1}^{I_s} (A_i * R_i)$$

of basic processing units comprised in the data objects based on a user number I in each sector associated with the frequency-domain data, an antenna number $A_i$ of each user and a number $R_i$ of allocated resource blocks, wherein S is a number of sectors associated with the data objects.

14. The apparatus according to claim 11, wherein the current stage is a third stage, the data objects are data carrier symbols and channel estimation symbols, and wherein the calculating module comprises:
a third estimating module configured to estimate the minimum number N based on a data amount of the data carrier symbols and channel estimation symbols on a single OFDM symbol in a single resource block of a single user; and
a third calculating module configured to calculate the number $$M = \sum_{s=1}^{S} \sum_{i=1}^{I_s} (R_i * F_i)$$

of basic processing units comprised in the data objects based on a user number $I_s$ in each sector associated with frequency-domain data, the number $R_i$ of allocated resource blocks and a number $F_i$ of OFDM symbols, wherein S is a number of sectors associated with the data objects.

15. The apparatus according to claim 11, wherein the current stage is a fourth stage, the data objects are an estimated value of an original code stream, and wherein the calculating module comprises:
a fourth estimating module configured to estimate the minimum number N based on the maximum data amount of code blocks associated with an estimated value of an original code stream; and
a fourth calculating module configured to calculate the number $$M = \sum_{s=1}^{S} \sum_{i=1}^{I_s} C_i$$

of basic processing units comprised in the data objects based on a user number $I_s$ in each sector associated with the estimated value of the original code stream and a number $C_i$ of code blocks of each user, wherein S is a number of sectors associated with the data objects.

16. The apparatus according to claim 11, wherein the current stage is a fifth stage, the data objects are transmission code blocks, and wherein the calculating module comprises:
a fifth estimating module configured to estimate the minimum number N based on the maximum data amount of code blocks associated with the transmission code blocks; and
a fifth calculating module configured to calculate the number $$M = \sum_{s=1}^{S} \sum_{i=1}^{I_s} C_i$$

of basic processing units comprised in the data objects based on a user number $I_s$ in each sector associated with an estimated value of an original code stream and a number $C_i$ of code blocks of each user, wherein S is a number of sectors associated with the data objects.

17. The apparatus according to claim 10, wherein the resource allocating module comprises:
a computing element allocating module configured to, in response to the total number of computing elements in the resource pool of computing elements being greater than or equal to the workload parameter P, allocate computing elements in the resource pool of computing elements for converting the data objects to data objects used for a next stage.

18. The apparatus according to claim 17, wherein the computing element allocating module comprises at least one of:
a first allocating module configured to allocate computing elements from a single server in the resource pool of computing elements; and
a second allocating module configured to allocate computing elements from multiple servers in the resource pool of computing elements.

* * * * *